US005863160A

United States Patent [19]

Havener

[11] Patent Number: 5,863,160

[45] Date of Patent: Jan. 26, 1999

[54] PORTABLE TOOL GUIDE

[76] Inventor: Dennis J. Havener, 11959 SE. 99th Ter., Belleview, Fla. 34420

[21] Appl. No.: 963,581

[22] Filed: Nov. 6, 1997

[51] Int. Cl.[6] ...... B23B 47/00

[52] U.S. Cl. ...... 408/136; 408/103; 408/712

[58] Field of Search ...... 408/136, 110, 408/103, 712

[56] References Cited

U.S. PATENT DOCUMENTS

| | | | |
|---|---|---|---|
| 442,905 | 4/1890 | Agoston | 408/136 |
| 1,201,050 | 10/1916 | Huff | 408/136 |
| 2,416,912 | 3/1947 | Curtis | 408/103 |
| 2,477,916 | 8/1949 | Wilhide | 408/136 |
| 2,625,063 | 1/1953 | Hanson | 408/712 |
| 2,973,673 | 3/1961 | Grau | 408/712 |
| 3,552,239 | 1/1971 | Yeaman et al. | 408/136 |
| 3,784,315 | 1/1974 | O'Brien | 408/712 |
| 4,585,376 | 4/1986 | Davenport, Sr. et al. | 408/136 |
| 5,244,048 | 9/1993 | Moorhead, Sr. | 408/136 |
| 5,322,397 | 6/1994 | Spear | 408/136 |

*Primary Examiner*—Daniel W. Howell
*Assistant Examiner*—Adesh Bhargava

[57] ABSTRACT

A new portable tool guide for providing extra leverage when using a power drill. The inventive device includes a first positioning member slidably mounted to a second positioning member. The second positioning member is slidably mounted to a mounting member which is detachably mountable to a structure. A lever member includes a position portion pivotally coupled to the first positioning member. Pivotally coupled to the positioning portion is the mounting portion designed for mounting a portable power tool thereto. The lever member also includes a handle portion extending from the positioning portion to help maneuver the lever member while in use.

12 Claims, 2 Drawing Sheets

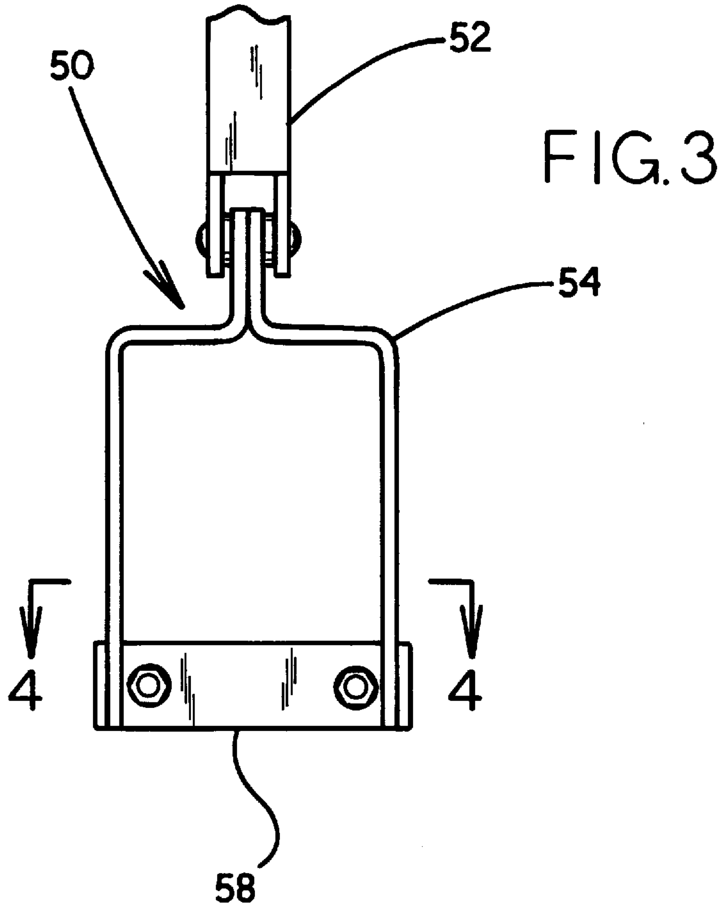
FIG. 3
FIG. 4
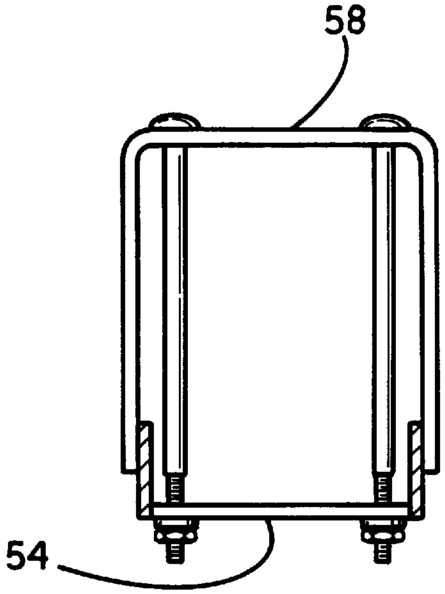

PORTABLE TOOL GUIDE

BACKGROUND OF THE INVENTION

1. Field of the Invention

The present invention relates to tool guiding devices and more particularly pertains to a new portable tool guide for providing extra leverage when using a power drill.

2. Description of the Prior Art

The use of tool guiding devices is known in the prior art. More specifically, tool guiding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art tool guiding devices include U.S. Pat. No. 4,168,926; U.S. Pat. No. 4,314,782; U.S. Pat. No. 5,006,022; U.S. Pat. No. 4,277,208; U.S. Pat. No. 4,080,092; and U.S. Patent No. Des. 243,505.

While these devices fulfill their respective, particular objectives and requirements, the aforementioned patents do not disclose a new portable tool guide. The inventive device includes a first positioning member slidably mounted to a second positioning member. The second positioning member is slidably mounted to a mounting member which is detachably mountable to a structure. A lever member includes a position portion pivotally coupled to the first positioning member. Pivotally coupled to the positioning portion is the mounting portion designed for mounting a portable power tool thereto. The lever member also includes a handle portion extending from the positioning portion to help maneuver the lever member while in use.

In these respects, the portable tool guide according to the present invention substantially departs from the conventional concepts and designs of the prior art, and in so doing provides an apparatus primarily developed for the purpose of providing extra leverage when using a power drill.

SUMMARY OF THE INVENTION

In view of the foregoing disadvantages inherent in the known types of tool guiding devices now present in the prior art, the present invention provides a new portable tool guide construction wherein the same can be utilized for providing extra leverage when using a power drill.

The general purpose of the present invention, which will be described subsequently in greater detail, is to provide a new portable tool guide apparatus and method which has many of the advantages of the tool guiding devices mentioned heretofore and many novel features that result in a new portable tool guide which is not anticipated, rendered obvious, suggested, or even implied by any of the prior art tool guiding devices, either alone or in any combination thereof.

To attain this, the present invention generally comprises a first positioning member slidably mounted to a second positioning member. The second positioning member is slidably mounted to a mounting member which is detachably mountable to a structure. A lever member includes a position portion pivotally coupled to the first positioning member. Pivotally coupled to the positioning portion is the mounting portion designed for mounting a portable power tool thereto. The lever member also includes a handle portion extending from the positioning portion to help maneuver the lever member while in use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable tool guide apparatus and method which has many of the advantages of the tool guiding devices mentioned heretofore and many novel features that result in a new portable tool guide which is not anticipated, rendered obvious, suggested, or even implied by any of the prior art tool guiding devices, either alone or in any combination thereof.

It is another object of the present invention to provide a new portable tool guide which may be easily and efficiently manufactured and marketed.

It is a further object of the present invention to provide a new portable tool guide which is of a durable and reliable construction.

An even further object of the present invention is to provide a new portable tool guide which is susceptible of a low cost of manufacture with regard to both materials and labor, and which accordingly is then susceptible of low prices of sale to the consuming public, thereby making such portable tool guide economically available to the buying public.

Still yet another object of the present invention is to provide a new portable tool guide which provides in the apparatuses and methods of the prior art some of the advantages thereof, while simultaneously overcoming some of the disadvantages normally associated therewith.

Still another object of the present invention is to provide a new portable tool guide for providing extra leverage when using a power drill.

Yet another object of the present invention is to provide a new portable tool guide which includes a first positioning member slidably mounted to a second positioning member.

The second positioning member is slidably mounted to a mounting member which is detachably mountable to a structure. A lever member includes a position portion pivotally coupled to the first positioning member. Pivotally coupled to the positioning portion is the mounting portion designed for mounting a portable power tool thereto. The lever member also includes a handle portion extending from the positioning portion to help maneuver the lever member while in use.

Still yet another object of the present invention is to provide a new portable tool guide that allows variably positioning of a mounted power tool over a structure the portable tool guide is mounted to.

Even still another object of the present invention is to provide a new portable tool guide that provides more hand power when drilling into structures at awkward positions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic partial side view taken from line 3—3 of FIG. 1 of the mounting portion of the lever member.

FIG. 4 is a schematic cross-sectional view taken from line 4—4 of FIG. 3 detailing the brace member and the mounting portion of the lever member.

DESCRIPTION OF THE PREFERRED EMBODIMENT

Figure 1:
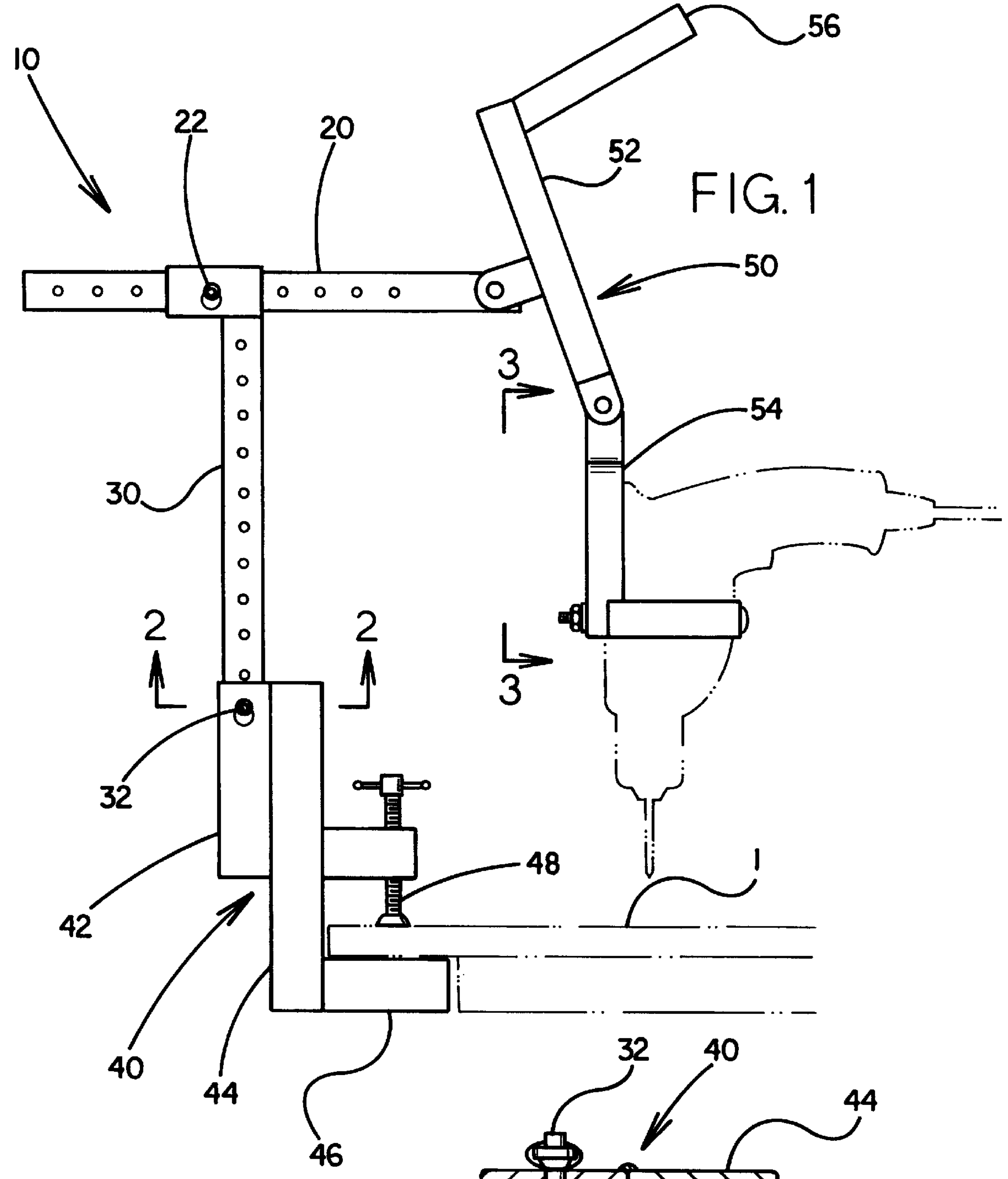
FIG. 1 is a schematic side view of a new portable tool guide according to the present invention in use mounted to a structure and holding a portable power tool.
Figure 2:
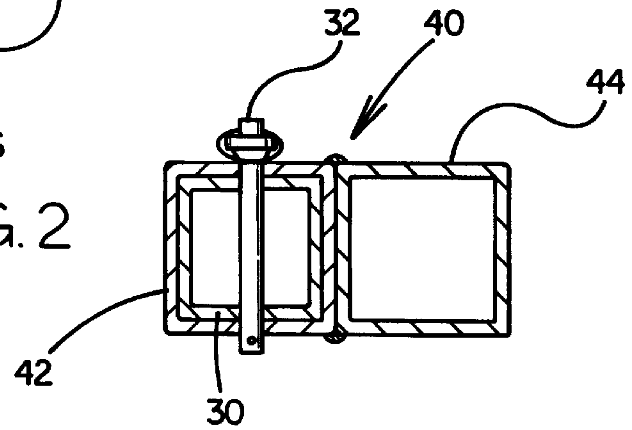
FIG. 2 is a schematic cross-sectional view taken from line 2—2 of FIG. 1 detailing the mounting member of the present invention.

With reference now to the drawings, and in particular to FIGS. 1 through 4 thereof, a new portable tool guide embodying the principles and concepts of the present invention and generally designated by the reference numeral 10 will be described.

As best illustrated in FIGS. 1 through 4, the portable tool guide 10 generally comprises a first positioning member 20 slidably mounted to a second positioning member 30. The second positioning member 30 is slidably mounted to a mounting member 40 which is detachably mountable to a structure 1. A lever member 50 includes a position portion 52 pivotally coupled to the first positioning member 20. Pivotally coupled to the positioning portion 52 is the mounting portion 54 designed for mounting a portable power tool 2 thereto. The lever member 50 also includes a handle portion 56 extending from the positioning portion 54 to help maneuver the lever member 50 while in use.

As shown in FIG. 1, the first positioning member 20 is slidably mounted to the first end of the second positioning member 30 to permit movement of the first positioning member 20 along a first direction. Similarly, with reference to FIGS. 1 and 2, the second member 30 is slidably mounted to the adjusting mounting portion 42 of the mounting member 40 to permit movement of the second positioning member 30 along a second direction. This arrangement allows positioning of the positioning members 20,30 by a user at a wide range of heights and distances to suit various sorts of structures and tasks.

Preferably, the second direction that the second positioning member 30 is movable along is substantially perpendicular to the first direction that the first positioning member 20 is movable along. Also preferably, holding means 22,32 are provides for selectively holding the first positioning member 20 and second positioning member 30 in a position along the first and second directions respectively. Ideally, the first and second positioning members 20,30 are elongated to help provide a wide range of positioning options for a user. Also ideally, the second positioning member 30 is positioned substantially perpendicular to the first portioning member 20.

The mounting member 40 also includes a structure mounting portion 44 designed for mounting the mounting member 40 to a structure 1. Preferably, the structure mounting portion 44 includes an abutment block 46 for abutting to a structure with an adjustable clamp 48 for permitting selective holding of various structures to the abutment block 46.

Also in the preferred embodiment, the handle portion 56 of the lever member 50 is extended from one end of the positioning portion 52 while the mounting portion 54 is pivotally coupled to the other end of the mounting portion 52. With reference to FIG. 3 and 4 the mounting portion 54 is designed for mounting a portable power tool 2 thereto. To accomplish this, ideally the portable tool guide 10 includes a U-shaped brace member 58 that is detachably attached to the mounting portion 54 so that a portable power tool 2 may be held between the brace member 58 and the mounting portion 54.

In use, as shown in FIG. 1, the portable tool guide 1 is designed aid a user using a portable power tool 2 such as a power drill. The structure mounting portion 44 of the mounting member 40 may be mounted to structures including horizontally and vertically to the structure 2. The adjustable clamp 48 permits the structure mounting portion 44 to be mounted to structure of varying thickness. The positioning members 20,30 may be moved along their respective directions to help a user position a power tool 1 held to the mounting portion 54. The user may then hold the handle portion 56 to help pivot the lever arm so that the help power tool 2 may be brought closer or further away from the structure 1. The pivot coupling between the mounting portion 54 and the positioning portion 52 of the lever member 50 allows a user to maintain the power tool 2 plumb with the structure 1 when the lever arm 50 is pivoted on the first positioning arm 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool guide for a portable power tool, comprising:

a first positioning member having first and second opposite ends;

a second positioning member having first and second opposite ends, said first positioning member being slidably mounted to said second positioning member first end to permit movement of said first positioning member along a first direction;

a mounting member, said second member being slidably mounted to said mounting member to permit movement of said second positioning member along a second direction, said mounting member being for mounting to a structure, and a lever member having a handle portion, a positioning portion, and a mounting portion, said positioning portion being pivotally coupled to said first positioning member first end, said mounting portion being pivotally coupled to said positioning portion, said mounting portion being for mounting a portable power tool thereto.

2. The tool guide of claim 1, wherein said first positioning member and said second positioning member are elongated.

3. The tool guide of claim 1, further comprising a first holding means for selectively holding said first positioning member in a position along said first direction.

4. The tool guide of claim 1, wherein said mounting member has a structure mounting portion and an adjusting mounting portion, and wherein said second member is slidably mounted to said adjusting mounting portion to permit movement of said second positioning member along a second direction, and wherein said structure mounting portion is for mounting to a structure.

5. The tool guide of claim 4, wherein said structure mounting portion includes an abutment block for abutting to a structure and an adjustable clamp for selectively holding a structure to said abutment block.

6. The tool guide of claim 1, further comprising a second holding means for selectively holding said second positioning member in a position along said second direction.

7. The tool guide of claim 1, wherein said second direction is substantially perpendicular to said first direction.

8. The tool guide of claim 1, wherein said second positioning member is positioned substantially perpendicular to said first portioning member.

9. The tool guide of claim 1, wherein said positioning portion of said lever member has a first end and a second end, and wherein said handle portion is extended from said positioning portion first end.

10. The tool guide of claim 9, wherein said mounting portion of said lever member is pivotally coupled to said positioning portion second end.

11. The tool guide of claim 1, further comprising a U-shaped brace member being detachably attached to said mounting portion of said lever member, said brace member being for holding a portable power tool to said mounting portion of said lever member.

12. A tool guide for a portable power tool, comprising:

an elongate first positioning member having first and second opposite ends;

an elongate second positioning member having first and second opposite ends, said first positioning member being slidably mounted to said second positioning member first end to permit movement of said first positioning member along a first direction;

a first holding means for selectively holding said first positioning member in a position along said first direction;

a mounting member having a structure mounting portion and an adjusting mounting portion, said second member being slidably mounted to said adjusting mounting portion to permit movement of said second positioning member along a second direction, said structure mounting portion being for mounting to a structure, said structure mounting portion having an abutment block for abutting to a structure and an adjustable clamp for selectively holding a structure to said abutment block;

a second holding means for selectively holding said second positioning member in a position along said second direction;

said second direction being substantially perpendicular to said first direction;

said second positioning member being positioned substantially perpendicular to said first portioning member;

a lever member having a handle portion, a positioning portion, and a mounting portion, said positioning portion having a first end and a second end, said handle portion being extended from said positioning portion first end, said positioning portion being pivotally coupled to said first positioning member first end, said mounting portion being pivotally coupled to said positioning portion second end, said mounting portion being for mounting a portable power tool thereto; and a U-shaped brace member being detachably attached to said mounting portion of said lever member, said brace member being for holding a portable power tool to said mounting portion of said lever member.

* * * * *